No. 710,237. Patented Sept. 30, 1902.
T. K. BARNARD.
PHOTOCHROMOSCOPIC APPARATUS.
(Application filed June 16, 1902.)

(No Model.) 3 Sheets—Sheet 1.

WITNESSES:
F. W. Wright
Walter Abb

INVENTOR
THOMAS KNIGHT BARNARD
BY Howson & Howson
HIS ATTORNEYS.

No. 710,237. Patented Sept. 30, 1902.
T. K. BARNARD.
PHOTOCHROMOSCOPIC APPARATUS.
(Application filed June 16, 1902.)

(No Model.) 3 Sheets—Sheet 2.

WITNESSES:
P. W. Wright
Walter Abbr

INVENTOR
THOMAS KNIGHT BARNARD
BY Howson & Howson,
HIS ATTORNEYS.

No. 710,237. Patented Sept. 30, 1902.
T. K. BARNARD.
PHOTOCHROMOSCOPIC APPARATUS.
(Application filed June 16, 1902.)

(No Model.) 3 Sheets—Sheet 3.

WITNESSES:
F. W. Wright.
M. H. Miles.

INVENTOR
THOMAS KNIGHT BARNARD
By
Howson and Howson
HIS ATTORNEYS.

UNITED STATES PATENT OFFICE.

THOMAS KNIGHT BARNARD, OF HAMMERSMITH, LONDON, ENGLAND.

PHOTOCHROMOSCOPIC APPARATUS.

SPECIFICATION forming part of Letters Patent No. 710,237, dated September 30, 1902.

Application filed June 16, 1902. Serial No. 111,920. (No model.)

*To all whom it may concern:*

Be it known that I, THOMAS KNIGHT BARNARD, photographic engineer, a subject of the King of Great Britain and Ireland, residing at 151 The Grove, Hammersmith, in the county of London, England, have invented certain new and useful Improvements in Photochromoscopic Apparatus; and I do hereby declare the following to be a full, clear, and exact description of the invention, such as will enable others skilled in the art to which it appertains to make and use the same.

This invention relates to photochromoscopic apparatus for reproducing the appearance of objects in relief and in their natural color when suitable photographic transparencies are viewed in it, the said apparatus being also adapted when provided with the necessary modifications for taking the negatives from which the photographic transparencies are made.

In describing my invention I will refer to the accompanying drawings, in which—

Figure 1:
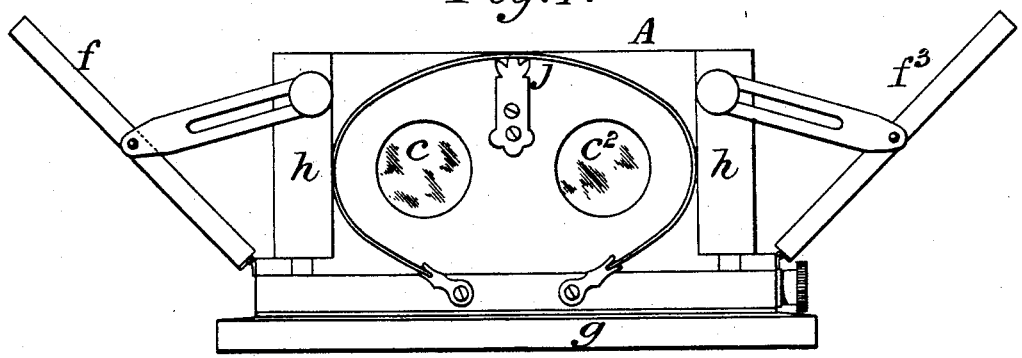
Figure 2:
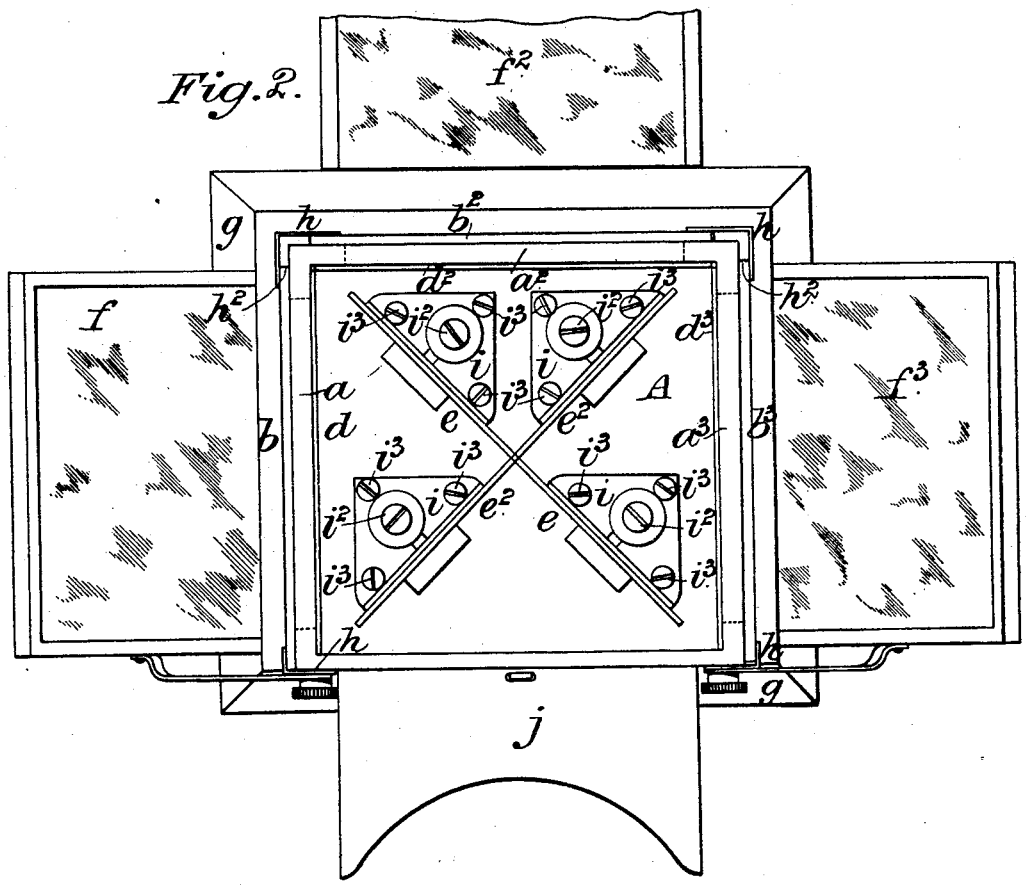
Figure 4:
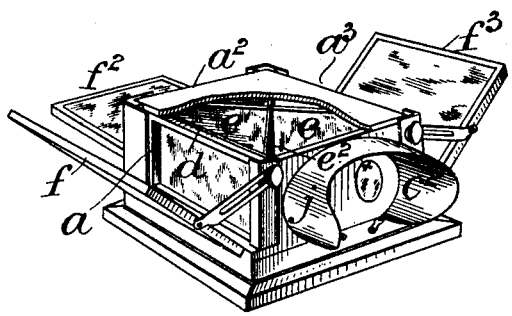
Figure 5:
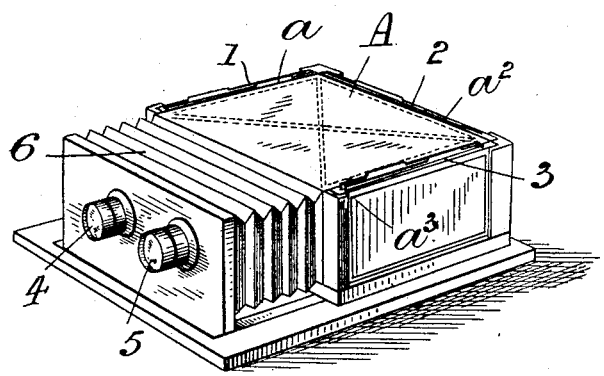

Figure 1 is a front elevation; Fig. 2, a plan with the cover removed; and Fig. 3, a side elevation, the latter figure showing the apparatus in a tilted position. Fig. 4 shows the apparatus in perspective, drawn to a smaller scale and with part of the cover broken away. Fig. 5 shows the apparatus adapted for taking the negatives from which the transparencies are made.

The apparatus consists of a box or casing A, which is shown square, although it may be of other figure, if desired. It has an aperture in each of the three sides $a$ $a^2$ $a^3$, these apertures being of a size to accommodate the respective photographic transparencies $b$ $b^2$ $b^3$ or sections of the chromogram or color-record, so that they are disposed at the said sides at right angles to the base. In the fourth side, constituting the front of the box or casing A, are lenses $c$ $c^2$. The apertures in the three sides $a$ $a^2$ $a^3$ permit the rays of light to reach the lenses $c$ $c^2$ after the said rays have passed through the sections of the chromogram $b$ $b^2$ $b^3$ and the color-screens $d$ $d^2$ $d^3$ appertaining to them, respectively. These color-screens are conveniently supported inside the apertures in the sides $a$ $a^2$ $a^3$ and may be red, green, and blue-violet or such modifications thereof as will, with the colors which the intersecting mirrors or reflectors $e$ $e^2$, hereinafter described, make up the respective complements of the primary colors. The chromogram-section $b^2$, which is opposite the lenses $c$ $c^2$, is viewed direct, and the other two sections $b$ and $b^3$ of the chromogram are viewed by reflection from the intersecting mirrors or reflectors $e$ $e^2$. The said mirrors or reflectors $e$ $e^2$ for this purpose are transparent, and they are preferably so colored or treated (for example by being platinized) that there is not a double outline or double reflection of the picture from the two sides of the said mirrors or reflectors, and these mirrors or reflectors when colored may, as aforesaid, be of such color or colors as to supplement the colors of the color-screens $d$ $d^2$ $d^3$. The mirrors or reflectors $e$ $e^2$ are arranged diagonally in the box or casing A and intersect each other and are in planes at right angles to the base and at such angles relatively to the respective sections of the chromogram as to reflect the superimposed images to the eye in straight lines the same as those followed by the light from the chromogram-section $b^2$, which is viewed direct. Thus if, as in the example illustrated, the box or casing be rectangular the mirrors or reflectors $e$ $e^2$ should be at or about angles of forty-five degrees to the sides, so that of the mirror or reflector $e^2$ (which reflects the images of the chromogram-section $b^3$) that side opposite the lens $c^2$ is the more remote from that lens and reflects the image corresponding to the right-hand image of the chromogram-section $b^2$ and that portion of the mirror or reflector $e^2$ which is opposite the lens $c$ reflects the image of the chromogram-section $b^3$, which corresponds to the left-hand image of the chromogram-section $b^2$. The mirror or reflector $e$ for reflecting the images of the left-hand chromogram-section is similarly arranged with respect to the images of the other sections and to the lenses. For convenience I may cut or form one or both of the mirrors or reflectors $e$ $e^2$ in halves to avoid slotting them each partly through at the place of intersection and also to facilitate their adjustment to secure superimposition of the images received from the respective sections.

Figure 3:
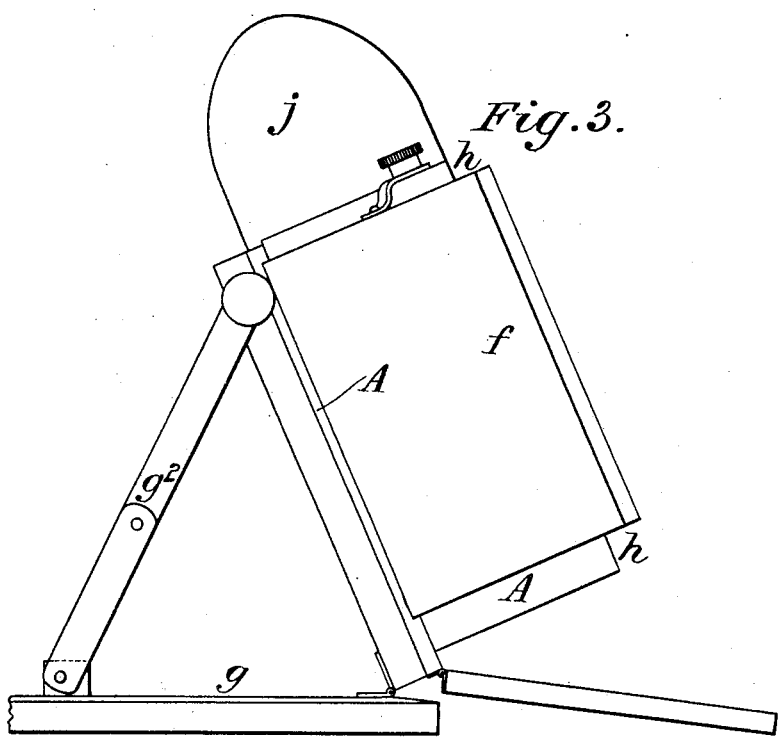

To secure the necessary illumination, I may use external mirrors or reflectors $f$ $f^2$ $f^3$, which may be hinged to the box or casing A, as shown, and the box or casing A may be hinged to a bed-plate or support, as at $g$, and be provided with jointed struts $g^2$, so that the instrument can be brought into an angular position, as shown in Fig. 3, when desired for the more convenient viewing of the pictures, and when the instrument is in this position the chromogram-sections $b\ b^3$ will adjust themselves by gravity if the sides $h^2$ in the guides $h$ for them at the angles of the box or casing A be properly placed. The chromogram-section $b^2$ can be pressed up to one side of its guides by a spring at the other side. $j'$ is a screen to exclude external light from the eyes of the person using the apparatus.

To enable the superimposition of the images from the several chromogram-sections to be easily adjusted, the halves of the mirrors or reflectors $e\ e^2$ may be carried by tripod-holders $i$, secured to the bottom of the box or casing A, which bottom is preferably of metal.

$i^3$ represents the adjustable screws constituting the tripod, and $i^2$ represents screws passed through a slot in each holder and screwing into the bottom of the box or casing A to fix the holders $i$ in their adjusted position.

As aforesaid, the color-screens $d\ d\ d^3$ may themselves be of the correct colors and the mirrors or reflectors $e\ e^2$ be uncolored and platinized or similarly treated to prevent double reflection, or the said screens and mirrors or reflectors may be so colored as to make up between them the requisite colors appertaining to each chromogram section. Then the correct green for the green image is obtained by the combined effect of the screen $b^2$ and mirrors or reflectors $e\ e^2$, the correct red for the red image is obtained by the combined effect of the screen $b^3$ and the yellow mirror or reflector $e$, and the correct blue is obtained by the combined effect of the screen $b$ and the mirror or reflector $e^2$. The chromogram-sections can be mounted in any suitable permanent or temporary mounts.

When the instrument is to be used for taking chromograms, sensitized plates in dark slides 1, 2, and 3 are mounted before or in the apertures $a\ a^2\ a^3$, and suitable photographic objectives 4 and 5 are used at the apertures $c\ c^2$. $b$ represents the focusing-bellows. In this case the reflectors $f\ f^2\ f^3$ are not required.

I claim as my invention—

1. A photochromoscopic apparatus consisting of an apertured box and intersecting reflectors arranged diagonally therein, as described.

2. A photochromoscopic apparatus consisting of a rectangular apertured box, intersecting reflectors therein and chromograms perpendicular to the base of the box, as described.

3. A photochromoscopic apparatus consisting of a rectangular apertured box with two intersecting, diagonally-arranged, reflectors perpendicular to the base, substantially as described.

4. A photochromoscopic apparatus, consisting of a box having the back and two sides open, the openings being adapted to contain transparencies of substantially the same length as the sides and the back, substantially as described.

5. A photochromoscopic apparatus, having a base and a covered top, means in the front for viewing chromograms, the two sides and the back being open, except at the corners, and adapted to contain chromograms, and reflectors within the box arranged diagonally, substantially as described.

6. A photochromoscopic apparatus, comprising an apertured box, chromograms in the sides and back and a viewing means in the front and intersecting reflectors arranged diagonally within the box, substantially as described.

7. A photochromoscopic apparatus, comprising an apertured box having a closed top and base, lenses in the front, openings of substantially the same area of the back and sides in said back and sides, diagonally-arranged reflectors within the box, and hinged mirrors at the sides and back, substantially as described.

8. A photochromoscopic apparatus, having diagonally-arranged intersecting reflectors mounted in an apertured box and adapted to be individually adjusted, substantially as described.

9. A photochromoscopic apparatus, comprising an apertured box and reflectors therein, each reflector being mounted in a tripod-adjusting means.

10. A photochromoscopic apparatus, comprising an apertured box and four reflectors mounted therein, all meeting centrally and extending away from the center to form substantial diagonals, as described.

11. A photochromoscopic apparatus, comprising an apertured box and four reflectors mounted therein, each reflector having an individual adjusting means, all the reflectors meeting centrally and extending away from the center to form substantial diagonals, as described.

In testimony whereof I affix my signature in presence of two witnesses.

THOMAS KNIGHT BARNARD.

Witnesses:
 ALBERT SMITH,
 PERCY READ GOLDRING.